ically equal to the length of the spool S.

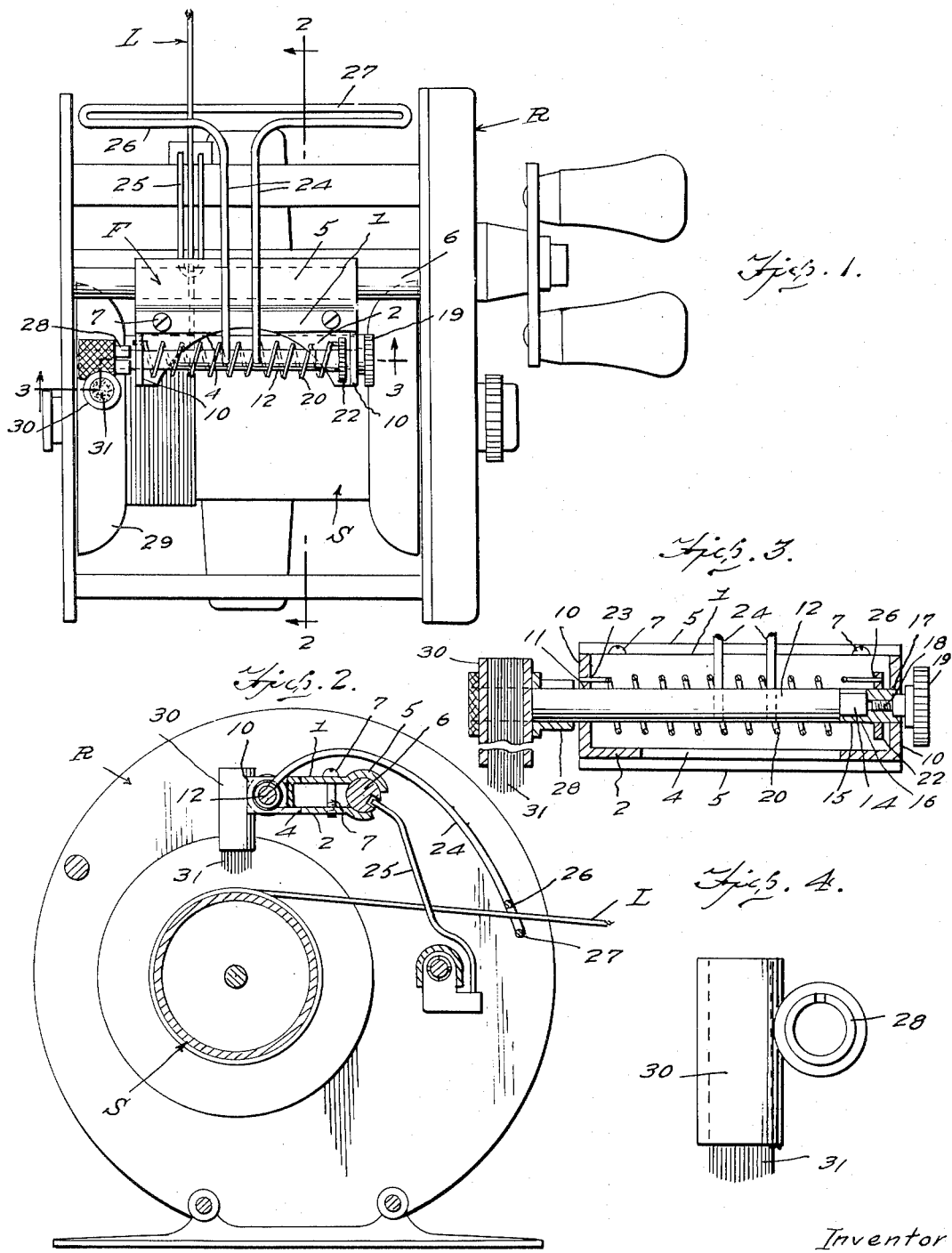

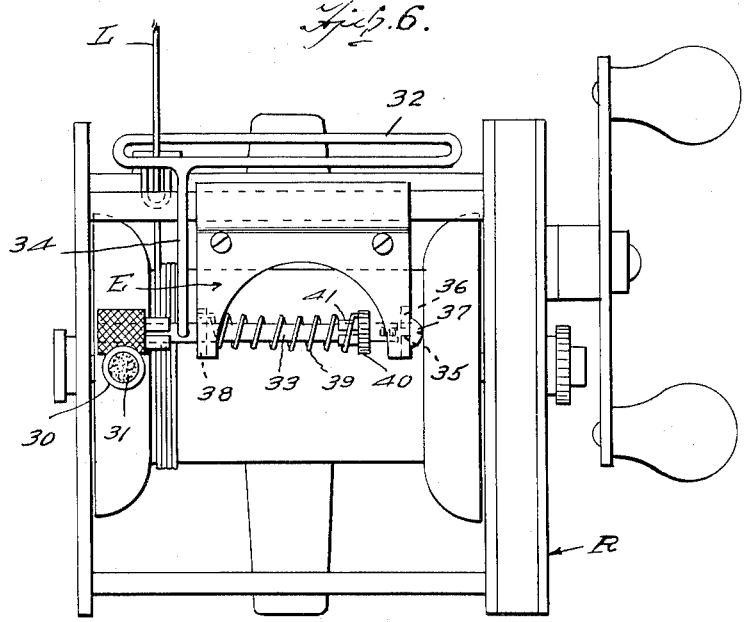
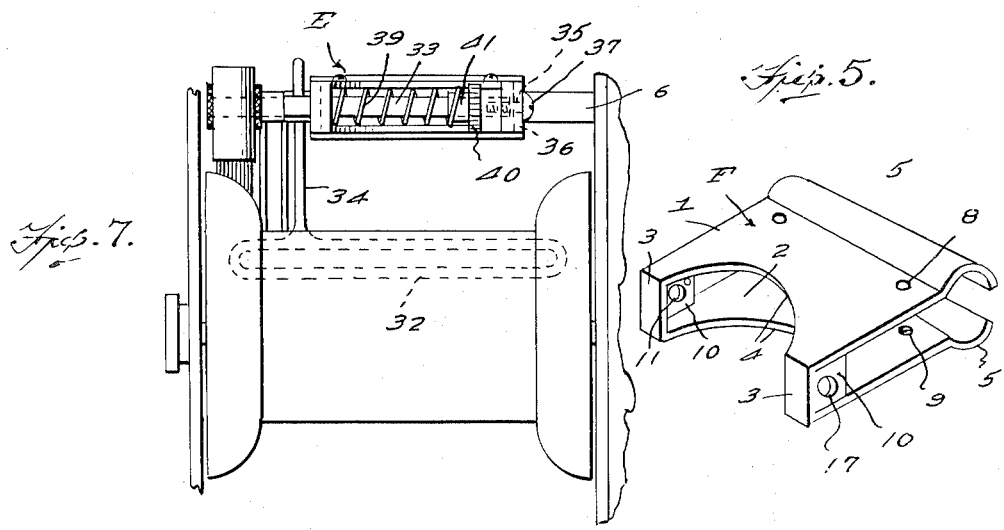
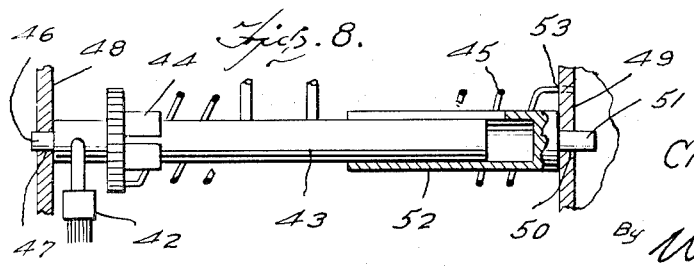

United States Patent Office 2,753,129
Patented July 3, 1956

2,753,129

FISHING REEL ATTACHMENT

Charles A. Martin, Tupelo, Miss., assignor of one-third to Arthur W. Price, and one-third to John R. Pegues, Jr., both of Tupelo, Miss.

Application August 20, 1952, Serial No. 305,337

2 Claims. (Cl. 242—84.5)

This invention relates to a fishing reel attachment and it is an object of the invention to provide an attachment of this kind that operates automatically to take up backlash of the fishing line and also to prevent overrunning of the line from the reel when casting.

It is also an object of the invention to provide means for braking automatically the spool of a reel when there is no tension on the fishing line or when the line is slack.

The invention also has for an object to provide a braking means for the spool of a fishing reel of a type wherein the attachment may be readily adjusted to fit reels of different widths.

An additional object of the invention is to provide a construction that is not affected by the sudden impact on the reel and the rod by the jerk of the line at the end of a casting stroke.

A still further object of the invention is to provide a means of leverage in the form of wire guides formed so as to allow the fishing line freedom without having to follow the line back and forth as the level winder carries the line from end to end of the spool.

The invention consists in the details of construction and in the combination and arrangement of the several parts of my improved fishing reel attachment whereby certain advantages are attained, as will be hereinafter more fully set forth.

In order that my invention may be better understood, I will now proceed to describe the same with reference to the accompanying drawings, wherein:

Figure 1 is a view in top plan illustrating an attachment constructed in accordance with an embodiment of the invention in applied position upon a reel.

Figure 2 is a sectional view taken substantially on the line 2—2 of Figure 1, looking in the direction of the arrows.

Figure 3 is an enlarged detail sectional view taken substantially on the line 3—3 of Figure 1, looking in the direction of the arrows.

Figure 4 is a view in elevation of the inner side of the brake shoe unit unapplied.

Figure 5 is a view in perspective of the frame as herein embodied unapplied.

Figure 6 is a view in top plan illustrating a modified form of the invention in applied position on a reel.

Figure 7 is a view in rear elevation of the assembly shown in Figure 6 with the reel in fragment; and Figure 8 is a view partly in elevation and partly in section illustrating another modification.

In the embodiment of the invention as comprised in Figures 1 to 5 of the drawings, F denotes a frame comprising two superimposed plates 1 and 2 spaced apart a desired distance. These plates 1 and 2 are coextensive in length and the rear margins thereof and the end portions of the plates 1 and 2 are connected by the narrow plates 3 preferably integral therewith. The rear marginal portions of the plates 1 and 2 between the plates 3 are preferably cut-out as at 4.

The forward marginal portions of the plates 1 and 2 are formed therealong from end to end with the opposed jaws 5 which receive therebetween a spacer rod 6 of the reel R. The jaws 5 are clamped to the post 6 by the headed screws 7. These screws 7 freely pass through the openings 8 in the plate 1, which is uppermost when the attachment is applied, and threads into the openings 9 in the second or lower plate 2. The heads of the screws 7 contact the outer face of the plate 1 so that as the screws 7 enter the openings 9 the jaws 5 will have desired effective clamping engagement with the rod 6 and thus maintain the frame F in desired position extending inwardly from the rod 6 over the spool S of the reel R.

The outer margins of the plates 3 are provided with the lug plates 10. Disposed through an opening 11 in one of the lug plates 10 is a shaft 12 of a length to closely approach the lug plate 10 at the opposite end of the frame but terminating inwardly thereof. The inserted end portion of the shaft 12 is reduced in diameter, as at 14, and frictionally received on said portion 14 is a split socket 15 of a stub shaft 16 which extends through an opening 17 in the second lug plate 10. Threaded into the outer end portion of the stub shaft 16 is the stem or shank 18 rigid with a knurled head 19. The coaction between the stub shaft 16 and the head 19 is such to allow the stub shaft 16 to be rotated as desired to regulate the tension of the spring 20.

The spring 20 is of a coiled type and surrounds the shaft 12 and extends a major distance therealong. One extremity of the spring 20 is anchored, as at 26, to a disk 22 mounted on the stub shaft 16 for rotation therewith while the opposite extremity of the spring 20 is anchored, as at 23 to lug plate 10 remote from the stub shaft 16. The spring 20 constantly rotatably urges the shaft 12 in one direction or resists its rotation in the opposite direction and the tension of the spring may readily be regulated within certain limitations. The frictional engagement of the portion 14 of the shaft 12 with the socket 15 of the stub shaft 16 holds the shaft 12 and the stub shaft 16 normally against relative rotation. When it is desired to adjust the tension of the spring 20, the shaft 12 must be manually held against rotation.

Rigid with the central portion of shaft 12 are the spaced brake levers 24 which extend upwardly and downwardly on a suitable curvature to bridge the rod 6 and jaws 5 engaged therewith and terminating in advance of the spool S and the level winding guide 25. The outer levers 24 are in continuation of the central free extremities of the inner bars 26 of the line guide loop 27. The guide loop is of a length substantially equal to the length of the spool S.

The applied shaft 12 has its end portion remote from the portion 14 and extends a material distance beyond the adjacent side of the frame F and frictionally mounted on said extended portion of the shaft is a split sleeve 28 the outer end portion of which being enlarged to provide a knurled head particularly to facilitate the rotary adjustment of the sleeve 28 around the shaft 12.

The applied sleeve 28 overlies an end flange 29 of the spool S and rigid with said sleeve 28 and substantially at right angles threreto is a tubular brake head 30 in which is tightly held a brake shoe 31 of fiber, leather or such other material as may be preferred.

In practice, the spring 20 urges the levers 24 and guide loop 27 upwardly but during casting, when the line L is taut, the loop 27 and levers 24 are held down thus lifting the brake shoe 31 free from the flange 29 of the spool S. However, when the line L is loose or slack, the tension of the spring 20 lifts the levers 24 forcing the brake shoe 31 against the flange 29 of the spool S, thus stopping rotation of the spool S and preventing the spool S from over-running and snarling the line on the spool, known as "back-lashing."

The cut out portions 4 of the plates 1 and 2 of the frame F, and particularly of the plate 1, are of a depth sufficient to allow unhindered passage of the levers 24.

The device as illustrated in Figures 6 and 7 is substantially the same as that embodied in Figures 1 to 5 inclusive except that the line guide loop 32 is closed and is operatively engaged with the shaft 33 to one side of the frame F, by a single lever 34.

The frame E is substantially in duplicate of the frame F except that the opening in 35 of one of the lug plates 36 is of less diameter than the opening of the second lug plate. The shaft 33 is readily insertible through the opening in the second lug plate and the applied shaft 33 closely approaches the lug plate 35 to permit the headed shank 37 to thread into the adjacent end portion of the shaft 33. The opening 35 is of a diameter closely approaching the diameter of the shank 37 whereby the shank 37 serves as a supporting trunnion for the shaft 33.

The second lug plate 38 of the frame F has anchored thereto an extremity of the coil spring 39 which encircles the shaft 33. The opposite extremity of the spring 39 is anchored to a surrounding knurled head 40 carried by a split sleeve 41 frictionally engaged on the shaft 33. The tension of the spring 39 may be regulated by desired rotation of the sleeve 41 about the shaft 33.

In the embodiment of the invention as illustrated in Figures 6 and 7, the single lever 34 allows the mounting of the loop guide 32 upon the shaft 33 before the shaft 33 is mounted on the frame E. The lever 34 may be held to the shaft 33 in a manner desired as is also true with the attachment of the levers 24 to the shaft 12.

While not shown in the drawings, it is to be stated that the spring 20 or the spring 39 may be housed within a tube to prevent the line L contacting the spring and otherwise protect the spring and associated parts.

In the embodiment of the invention illustrated in Figure 8, the brake 42 is carried directly by an end portion of the shaft 43 and outwardly of a split sleeve 44 frictionally mounted on the shaft 43 and to which is anchored an extremity of the coil spring 45 surrounding the shaft 43. The end of the shaft 43 adjacent to the sleeve 44 is continued by a reduced trunnion 46 which is adapted to engage through an opening 47 in one of the end plates 48 of a reel. The opposite end plate 49 of the reel has an opening 50 which receives a trunnion 51 extending from the outer closed end of an elongated shaft sleeve 52 which frictionally engages and receives the end portion of the shaft 43 remote from the trunnion 46. The extremity of the spring 45 remote from the sleeve 44 is anchored, as at 53, to the end plate 49.

The sleeve 52 constitutes a continuation of the shaft 43 and by adjusting the sleeve lengthwise of the shaft 43, the shaft can be applied with certain limitations to reels of varying widths.

It is to be pointed out that the various split sleeves hereinbefore referred to initially have the split portions slightly flattened to assure desired frictional contact.

In the accompanying drawings the brake shoe 31 is indicated as being composed of a plurality of bristles or longitudinal fibers. It has been found in practice that a shoe of this kind is preferable to a shoe formed from a solid mass of material such as leather, rubber, plastic, etc. By the use of bristles or longitudinal fibers a brake shoe is provided that will act on the revolving spool in a manner whereby the spool is steadied and causes a smoother motion of the spool. The resiliency of the bristles or fibers tend to feather the spool so that a smooth braking action is produced and does not vibrate or chatter.

By using guide loops 27 or 32, which in practice are substantially horizontal or substantially in parallelism with the axis of the spool S, there is a material cut down on inertia of the lever 24 and 34 together with a material reduction of friction between the line and the loop 27 or 32.

I claim:

1. In combination, a fishing line reel, including the spool and a spacer rod thereof, and a brake attachment therefor, said attachment comprising an elongated frame, clamping means carried by said frame for its support from said spacer rod, a shaft extending lengthwise of and parallel to said frame and supported for turning movements adjacent one of its ends in one end of the frame, a brake shoe mounted on the outer end of said shaft beyond the said frame end for braking engagement with said spool, means mounted for turning movements, in line with and relative to said shaft, in the opposite end of said frame, a coil spring encircling said shaft and having one of its ends secured to the said one end of the frame and its other end to said means whereby its tension may be adjusted upon the manipulation of the means, an elongated guide loop through which the line passes from said spool, means projecting radially from said shaft for supporting said loop parallel to the spool, the line, when taut, coacting with the loop to hold the shoe free from braking engagement with the spool, said spring acting to turn said shaft in a direction to move the shoe into spool braking position when the line is slack.

2. The combination of a line reel, including the spool and a spacer rod thereof and a brake attachment therefor, said attachment comprising an elongated frame connected at one end to said rod and extending parallel to the hub of the spool for substantially the length thereof, a shaft carried by the frame, a brake shoe carried by the shaft for braking engagement with an end plate of the spool, a line guide loop carried by the shaft and through which the line passes, said loop extending parallel to said frame and having a length greater than that of the frame and substantially equal to that of the spool, said line when taut coacting with the line guide loop to hold the brake shoe free from the spool, and automatic means for urging the brake shoe into braking contact with the said end plate of the spool when the line is slack, and other means for rotatable adjustment of the brake shoe with mutual respect to the end plate of said spool and said shaft; the said automatic means comprising a knurled head having an integral friction sleeve portion for frictionally gripping the shaft and rotatably mounted on the shaft, a coil spring encircling said shaft, one extremity of the spring being anchored to the frame and the opposite extremity to the friction sleeve portion of the knurled head, rotation of the knurled head relatively to the said shaft effecting adjustment of tension of the spring.

References Cited in the file of this patent

UNITED STATES PATENTS

| 1,305,910 | Liddell | June 3, 1919 |
| 2,059,519 | Harris | Nov. 3, 1936 |
| 2,205,641 | Wilson | June 25, 1940 |
| 2,487,316 | Daniel | Nov. 8, 1949 |
| 2,555,604 | Pies | June 5, 1951 |
| 2,607,547 | Pasanen | Aug. 19, 1952 |
| 2,620,142 | Dilley et al. | Dec. 2, 1952 |

FOREIGN PATENTS

| 151,733 | Great Britain | Sept. 20, 1920 |